United States Patent
Westerman et al.

(10) Patent No.: US 10,642,330 B2
(45) Date of Patent: May 5, 2020

(54) INTERGRATED MULTI-TOUCH SURFACE HAVING VARYING SENSOR GRANULARITY

(71) Applicant: Apple Inc., Cupertino, CA (US)

(72) Inventors: Wayne Carl Westerman, Burlingame, CA (US); John Greer Elias, Townsend, DE (US); Steven P. Hotelling, Los Gatos, CA (US); Duncan Robert Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/013,754

(22) Filed: Jun. 20, 2018

(65) Prior Publication Data

US 2018/0299938 A1 Oct. 18, 2018

Related U.S. Application Data

(63) Continuation of application No. 15/847,454, filed on Dec. 19, 2017, now Pat. No. 10,025,366, which is a
(Continued)

(51) Int. Cl.
*G06F 3/041* (2006.01)
*G06F 1/3203* (2019.01)
(Continued)

(52) U.S. Cl.
CPC .......... *G06F 1/3203* (2013.01); *G06F 1/3262* (2013.01); *G06F 3/044* (2013.01);
(Continued)

(58) Field of Classification Search
CPC ...... G06F 1/3203; G06F 1/3262; G06F 3/044; G06F 3/04883
(Continued)

(56) References Cited

U.S. PATENT DOCUMENTS

| 5,374,787 A | 12/1994 | Miller et al. |
| 5,483,261 A | 1/1996 | Yasutake |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Notice of Allowance dated Feb. 7, 2019, for U.S. Appl. No. 15/798,222, filed Oct. 30, 2017, eight pages.

(Continued)

*Primary Examiner* — Jonathan M Blancha
(74) *Attorney, Agent, or Firm* — Kubota & Basol LLP (57) ABSTRACT

This relates to an event sensing device that includes an event sensing panel and is able to dynamically change the granularity of the panel according to present needs. Thus, the granularity of the panel can differ at different times of operation. Furthermore, the granularity of specific areas of the panel can also be dynamically changed, so that different areas feature different granularities at a given time. This also relates to panels that feature different inherent granularities in different portions thereof. These panels can be designed, for example, by placing more stimulus and/or data lines in different portions of the panel, thus ensuring different densities of pixels in the different portions. Optionally, these embodiments can also include the dynamic granularity changing features noted above.

20 Claims, 6 Drawing Sheets

Related U.S. Application Data continuation of application No. 15/685,728, filed on Aug. 24, 2017, now Pat. No. 9,870,041, which is a continuation of application No. 11/818,477, filed on Jun. 13, 2007, now Pat. No. 9,772,667.

(51) Int. Cl.
    *G06F 1/3234*     (2019.01)
    *G06F 3/044*     (2006.01)
    *G06F 3/0488*     (2013.01)

(52) U.S. Cl.
    CPC ............... *G06F 3/04883* (2013.01); *G06F 2203/04808* (2013.01); *Y02D 50/20* (2018.01)

(58) Field of Classification Search
    USPC ........................................................ 345/173
    See application file for complete search history.

(56) References Cited

U.S. PATENT DOCUMENTS

| | | |
|---|---|---|
| 5,488,204 A | 1/1996 | Mead et al. |
| 5,554,828 A | 9/1996 | Primm |
| 5,825,352 A | 10/1998 | Bisset et al. |
| 5,835,079 A | 11/1998 | Shieh |
| 5,845,161 A | 12/1998 | Schrock et al. |
| 5,880,411 A | 3/1999 | Gillespie et al. |
| 6,188,391 B1 | 2/2001 | Seely et al. |
| 6,310,610 B1 | 10/2001 | Beaton et al. |
| 6,310,611 B1 | 10/2001 | Caldwell |
| 6,323,846 B1 | 11/2001 | Westerman et al. |
| 6,429,857 B1 | 8/2002 | Masters et al. |
| 6,459,424 B1 | 10/2002 | Resman |
| 6,593,916 B1 | 7/2003 | Aroyan |
| 6,690,387 B2 | 2/2004 | Zimmerman et al. |
| 7,015,894 B2 | 3/2006 | Morohoshi |
| 7,148,704 B2 | 12/2006 | Philipp |
| 7,184,064 B2 | 2/2007 | Zimmerman et al. |
| 7,495,659 B2 | 2/2009 | Marriott et al. |
| 7,663,607 B2 | 2/2010 | Hotelling et al. |
| 7,956,846 B2 | 6/2011 | Ording et al. |
| 8,054,300 B2 | 11/2011 | Bernstein |
| 8,390,597 B2 | 3/2013 | Bernstein |
| 8,479,122 B2 | 7/2013 | Hotelling et al. |
| 9,250,720 B2 | 2/2016 | George et al. |
| 9,304,575 B2 | 4/2016 | Lee et al. |
| 9,830,034 B2 | 11/2017 | Lee et al. |
| 2002/0060668 A1 | 5/2002 | McDermid |
| 2004/0090431 A1 | 5/2004 | Kong et al. |
| 2004/0252109 A1 | 12/2004 | Trent et al. |
| 2005/0104867 A1 | 5/2005 | Westerman et al. |
| 2005/0212773 A1 | 9/2005 | Asbill |
| 2005/0264589 A1 | 12/2005 | Kimoto et al. |
| 2006/0026521 A1 | 2/2006 | Hotelling et al. |
| 2006/0097991 A1 | 5/2006 | Hotelling et al. |
| 2006/0161870 A1 | 7/2006 | Hotelling et al. |
| 2006/0164978 A1* | 7/2006 | Werner ............... H04L 41/0896 370/229 |
| 2006/0197753 A1 | 9/2006 | Hotelling |
| 2007/0063991 A1 | 3/2007 | Lee et al. |
| 2007/0113681 A1 | 5/2007 | Nishimura et al. |
| 2007/0152980 A1 | 7/2007 | Kocienda et al. |
| 2008/0007533 A1 | 1/2008 | Hotelling |
| 2008/0122798 A1 | 5/2008 | Koshiyama et al. |
| 2008/0158167 A1 | 7/2008 | Hotelling et al. |
| 2008/0158172 A1 | 7/2008 | Hotelling et al. |
| 2008/0277171 A1 | 11/2008 | Wright |
| 2009/0251434 A1 | 10/2009 | Rimon et al. |
| 2009/0309851 A1 | 12/2009 | Bernstein |
| 2010/0123686 A1 | 5/2010 | Klinghult et al. |
| 2011/0025619 A1 | 2/2011 | Joguet et al. |
| 2011/0032199 A1 | 2/2011 | Seo et al. |
| 2012/0050333 A1 | 3/2012 | Bernstein |
| 2013/0176251 A1 | 7/2013 | Wyatt et al. |
| 2013/0194195 A1 | 8/2013 | Parekh et al. |
| 2013/0265276 A1 | 10/2013 | Obeidat et al. |
| 2014/0160067 A1 | 6/2014 | Kim et al. |
| 2016/0041683 A1 | 2/2016 | Ma et al. |
| 2016/0195959 A1 | 7/2016 | Lee et al. |
| 2018/0046285 A1 | 2/2018 | Lee |

FOREIGN PATENT DOCUMENTS

| | | |
|---|---|---|
| WO | WO-01/40922 A1 | 6/2001 |
| WO | WO-03/071345 A2 | 8/2003 |
| WO | WO-2005/020057 A2 | 3/2005 |
| WO | WO-2005/020057 A3 | 3/2005 |
| WO | WO-2008/157237 A2 | 12/2008 |

OTHER PUBLICATIONS

Final Office Action dated Aug. 13, 2018, for U.S. Appl. No. 15/798,222, filed Oct. 30, 2017, 9 pages.
Anonymous. (Apr. 13, 2004). Proximity Sensor Demo Kit, User Guide, Version 0.62—Preliminary, Integration Associates, Inc., 14 pages.
Final Office Action dated Apr. 14, 2011, for U.S. Appl. No. 11/818,477, filed Jun. 13, 2007, 20 pages.
Final Office Action dated Dec. 3, 2013, for U.S. Appl. No. 11/818,477, filed Jun. 13, 2007, 37 pages.
Final Office Action dated Jan. 17, 2017, for U.S. Appl. No. 15/068,426, filed Mar. 11, 2016, 14 pages.
International Search Report dated Jun. 8, 2009, for PCT Application No. PCT/US2008/066724, filed Jun. 12, 2008, seven pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Dec. 2, 2010, for U.S. Appl. No. 11/818,477, filed Jun. 13, 2007, 18 pages.
Non-Final Office Action dated May 16, 2011, for U.S. Appl. No. 12/140,923, filed Jun. 17, 2008, eight pages.
Non-Final Office Action dated May 9, 2013, for U.S. Appl. No. 11/818,477, filed Jun. 13, 2007, 31 pages.
Non-Final Office Action dated Jul. 13, 2015, for U.S. Appl. No. 14/090,174, filed Nov. 26, 2013, nine pages.
Non-Final Office Action dated Jun. 2, 2016, for U.S. Appl. No. 15/068,426, filed Mar. 11, 2016, 12 pages.
Non-Final Office Action dated Dec. 13, 2016, for U.S. Appl. No. 11/818,477, filed Jun. 13, 2007, 36 pages.
Non-Final Office Action dated Jan. 16, 2018, for U.S. Appl. No. 15/798,222, filed Oct. 30, 2017, 16 pages.
Notice of Allowance dated May 16, 2011, for U.S. Appl. No. 12/140,923, filed Jun. 17, 2008, seven pages.
Notice of Allowance dated Nov. 28, 2012, for U.S. Appl. No. 13/290,939, filed Nov. 7, 2012, eight pages.
Notice of Allowance dated Dec. 3, 2015, for U.S. Appl. No. 14/090,174, filed Nov. 26, 2013, five pages.
Notice of Allowance dated May 25, 2017, for U.S. Appl. No. 11/818,477, filed Jun. 13, 2007, eight pages.
Notice of Allowance dated Jul. 25, 2017, for U.S. Appl. No. 15/068,426, filed Mar. 11, 2016, seven pages.
Notice of Allowance dated Sep. 13, 2017, for U.S. Appl. No. 15/685,728, filed Aug. 24, 2017, 10 pages.
Notice of Allowance dated Mar. 28, 2018, for U.S. Appl. No. 15/847,454, filed Dec. 19, 2017, eleven pages.
Rekimoto "SmartSkin: An Infrastructure for Freehand Manipulation on Interactive Surfaces," CHI 2002.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

(56) References Cited

OTHER PUBLICATIONS

Zimmerman et al., "Applying Electric Field Sensing to Human-Computer Interfaces," IEEE Sig., CHI, May 1995.

* cited by examiner

INTERGRATED MULTI-TOUCH SURFACE HAVING VARYING SENSOR GRANULARITY

CROSS-REFERENCE TO RELATED APPLICATIONS

This application is a continuation of U.S. patent application Ser. No. 15/847,454 (U.S. Patent Application Publication No. 2018/0107261), filed on Dec. 19, 2017, which is a continuation of U.S. patent application Ser. No. 15/685,728 (U.S. patent application Ser. No. 9,870,041), filed on Aug. 24, 2017, which is a continuation of U.S. patent application Ser. No. 11/818,477 (U.S. Pat. No. 9,772,667), filed on Jun. 13, 2007, the entire disclosures of which are incorporated herein by reference for all purposes.

FIELD OF THE INVENTION

This relates to multi-touch enabled surfaces, and more particularly to multi-touch enabled surfaces having varying sensor granularity.

BACKGROUND OF THE INVENTION

U.S. patent application Pub. No. US2008/0007533 entitled "Capacitance Sensing Electrode with Integrated I/O Mechanism" (incorporated by reference herein in its entirety) teaches capacitance-based touch sensing.

U.S. Pat. No. 7,495,659 entitled "Touch Pad for Handheld Device" (also incorporated herein by reference) teaches a pixel based touch pad. The touch pad of U.S. Pat. No. 7,495,659 can be considered to be a "single touch" touch pad, i.e., it can be configured to detect a single touch event at any one time. The touch pad of U.S. Pat. No. 7,495,659 does not disclose dynamically changing the granularity of touch pixels.

U.S. patent application Pub. No. US2008/0158172 entitled "Proximity and Multi-Touch Sensor Detection and Demodulation" (also incorporated by reference herein in its entirety) teaches a multi-touch sensing panel which can be combined with a display in a portable device. Thus, interaction between a user and the portable device can be improved, as the user can interact with dynamically displayed images by virtually touching them, moving them, turning them, etc. application Pub. No. US2008/0158172 also describes near field and far-field proximity sensing. Some previously described multi-touch panels (as well as near-field and far-field proximity panels) feature touch sensing elements (or touch pixels) that are of the same size. In other words, they feature touch sensors with uniform granularity.

U.S. Pat. No. 7,812,827 entitled "Simultaneous Sensing Arrangement" (incorporated by reference herein in its entirety) describes a multi-touch panel which initially scans for touch events at a low granularity and then, if it detects touch events in particular regions, scans for them with higher granularities. Thus, the panel of the U.S. Pat. No. 7,812,827 application, while providing that some regions may be initially scanned at lower granularities, still ensures that touch events at the entire panel are eventually scanned and processed at the same granularity.

Each touch pixel of a multi-touch panel can require a certain amount of power. Lower granularity can require less pixels and consequently less power. Minimizing the power usage can be very beneficial for multi-touch enabled devices. This can be especially true for devices having large displays/touch panels. However, in certain instances, a certain level of granularity may be necessary in order to correctly detect touch events.

SUMMARY OF THE INVENTION

This relates to an event sensing device that includes an event sensing panel and is able to dynamically change the granularity of the panel according to present needs. Thus, the granularity of the panel can differ at different times of operation. Furthermore, the granularity of specific areas of the panel can also be dynamically changed, so that different areas feature different granularities at a given time.

Thus, the power usage of the panel, and the panel's input resolution can be optimized. The granularity can be increased or kept high at times and areas of the panel where higher input resolution is necessary. If a lower input resolution is needed, the granularity can be decreased to save power.

In some embodiments, the panel can be a display. Furthermore, the panel can be, for example, a single-touch sensing panel, a multi-touch sensing panel, a near field proximity sensing panel or a far-field proximity sensing panel.

In some embodiments, the granularity of the panel or portions thereof can be controlled by selectively deactivating and activating one or more stimulus and/or data lines of the panel, thus deactivating one or more event sensing pixels of the panel. Also, two or more data lines can be connected to the same sensing circuit in order to combine two or more sensing pixels in a single sensing pixel.

This also relates to panels that feature different inherent granularities in different portions thereof. These panels can be designed, for example, by placing more stimulus and/or data lines in different portions of the panel, thus ensuring different densities of pixels in the different portions. Optionally, these embodiments can also include the dynamic granularity changing features discussed above.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the invention.

This relates to multi-touch, single touch and proximity sensor panels having varying sensor granularity.

Although embodiments of this invention are described herein in terms of devices utilizing mutual capacitance based multi-touch technologies, it should be understood that the invention is not limited to such devices, but is generally applicable to devices utilizing other touch and proximity sensing technologies as well.

Figure 1:
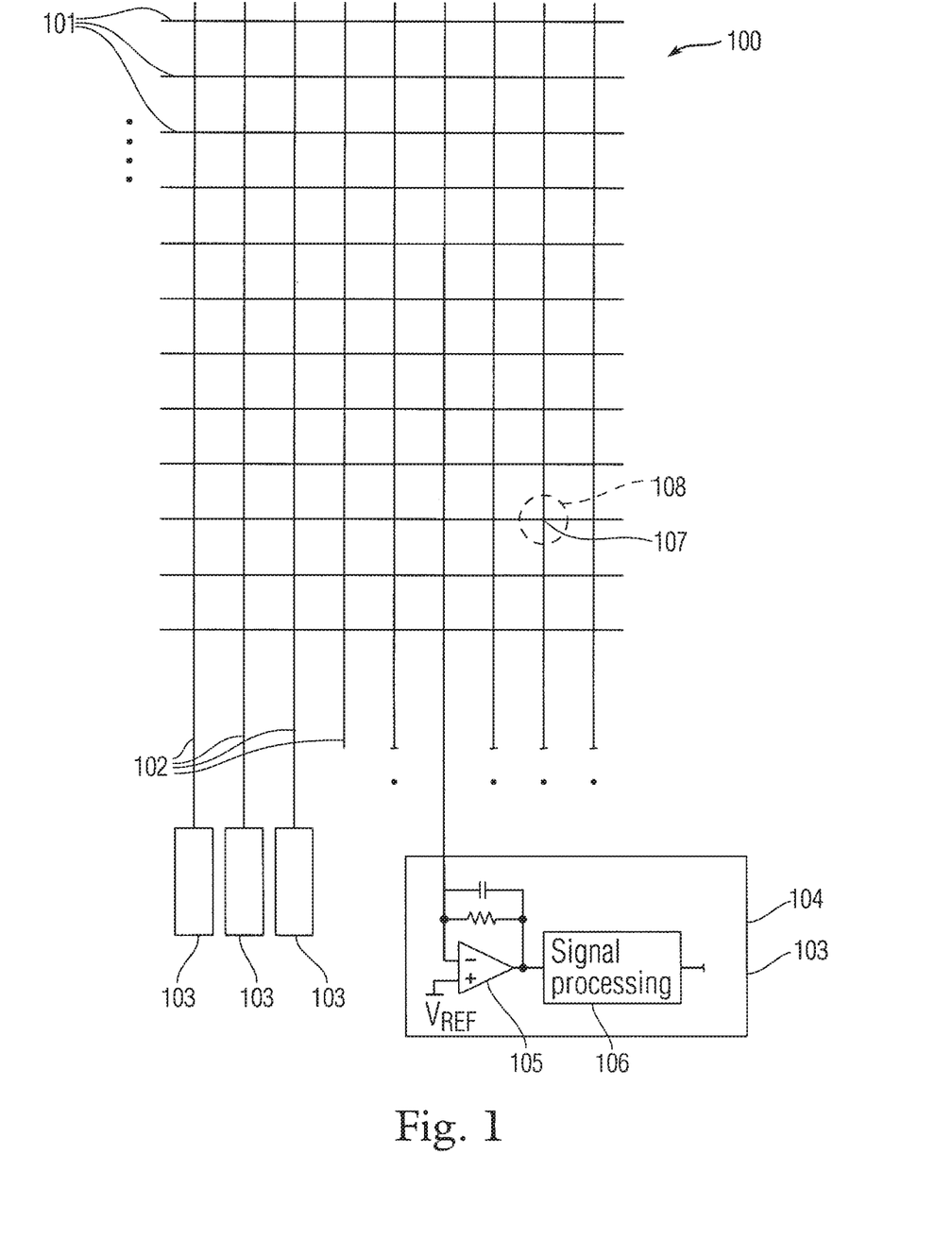
FIG. 1 is a diagram of an exemplary conventional multi-touch enabled display.

FIG. 1 is a diagram of an existing touch sensing panel 100. Panel 100 can be, for example, a multi-touch sensing panel. The panel can include plurality of stimulus lines 101 and data lines 102. The stimulus lines can intersect the data lines without being directly connected to them (e.g., by passing under or over the data lines). Each intersection of a stimulus line and a data line can define a touch pixel. Touch events can be detected at a touch pixel by measuring changes in the capacitance between stimulus and a data lines associated with the pixel. In some embodiments, changes in other capacitances (e.g., between a data line and a back plate) can also be measured to detect touch events.

Changes of the capacitances can be measured by sending a stimulus signal along consecutive stimulus lines 101 and detecting a resulting signal at lines 102. Lines 102 can be connected to sensing circuits 103. In some embodiments, the sensing circuits can include charge amplifiers. For example, circuit 104 is an exemplary sensing circuit 103. The circuit can include charge amplifier circuit 105 and signal processing circuit 106. The charge amplifier and signal processing circuits can together produce a digital value representative of the capacitance between a data line associated with circuit 104 and a stimulus line (or lines) that is currently being stimulated. In other words, at any one time the resulting digital signal can represent the capacitance at a touch pixel associated with these lines. This digital signal can be further processed to detect changes in this capacitance which may indicate the presence or absence of a touch event at the touch pixel.

A single touch sensing panel (i.e., a pane; capable of sensing a single touch event at a time only) can be similar to panel 100. In some embodiments, a single touch sensing panel can feature simpler touch sensing circuitry. For example, it may feature a single sensing circuit 103 which is time multiplexed to the different data lines 102. In other words, the various data lines can be periodically connected to the single sensing circuit.

Each touch pixel can be associated with an area for which the touch pixel is intended to detect touch events. For example, touch pixel 107 can be associated with area 108. Area 108 can be referred to as the size of the touch pixel. The size of a touch pixel can depend on the overall granularity (or density) of touch pixels. A high granularity can imply a higher number of touch pixels in a given area and thus a smaller size for each touch pixel. A higher granularity can be beneficial for certain applications as it can allow the device to detect the position of touch events with higher precision.

However, a higher granularity can require a higher number of stimulus and/or data lines. Each active data line can consume power. A stimulus line can consume power when a stimulus signal needs to be sent through it. A data line can consume power when active, because the sensing circuit associated with it (e.g., circuit 104) can consume power when active. For example, amplifier and signal processing circuits 105 and 106 may need external power to operate. Thus, a data line can consume power when active regardless of whether a touch event is occurring or not.

Therefore, reducing the number of stimulus and/or data lines can beneficially reduce power consumption. However, as noted above, some applications can require a high number of stimulus and data lines as they can require high pixel granularity.

Different applications can have different requirements as to the level of granularity of touch sensors. For example, a map application can require high granularity in order to sense when a user selects particular areas of the map, while a simple calculator application can require low granularity as it may feature relatively large buttons. Furthermore, a single application can have different granularity requirements at different times and at different areas of the screen. For example, an application can require high granularity during usual operation but can, at a certain time, display a simple yes or no dialog box, and disable all other input features. At this time, the only possible input for the user can be pressing one of two or more relatively large buttons. Thus, at the above referred time, the granularity requirement of the application can be relatively low.

In another example, an application can require a high granularity in a certain portion of a screen and lower granularity in other portions. For example, a video playback application can use a first portion of the screen for video play back. In that portion, the user can be expected to only provide simple inputs (such as, e.g., tapping the screen to start or stop the video, or dragging one or more fingers across the surface to fast forward or reverse the video). However, the application can use a second portion of the screen for a tool bar, where the user can press smaller and more complex buttons to perform more complex tasks (e.g., change volume, change subtitles, etc.) Thus, the application can require a higher level of granularity at that second portion of the screen.

In some existing devices, the solution can be to provide the highest level of granularity for the entire screen and at all times. However, these embodiments can result in higher than desired power usage due to the necessity to power a relatively high number of stimulus and data lines. Embodiments of this invention can solve this by allowing the device to dynamically change the granularity of the display according to present needs. Furthermore, the granularity of specific areas of the display can also be dynamically changed.

In some embodiments, the granularity can be changed in response to commands issued by a device's operating system or the applications running at the device. In one exemplary embodiment, the operating system (or other utility software running at the device) can receive various instructions from applications running at the device. The instructions can be intended to cause the device to display various objects at the device's display. The operating system can determine which of the objects to be displayed are visual control elements. Visual control elements can be visual elements which allow user interaction. Thus, visual control elements can include, for example, buttons, knobs, sliders, etc. In one embodiment, the operating system can control the granularity in order to ensure that portions of the display which include visual control elements feature higher granularity while portions that do not include such elements. Thus, it can be ensured that portions of the display with which the user is more likely to interact and for which it is more important to accurately detect user interaction feature higher granularity, while the granularity of other portions can be decreased to save power.

Alternatively or in addition, a user can be allowed to change the granularity by utilizing a configuration interface of the device.

Figure 2A:
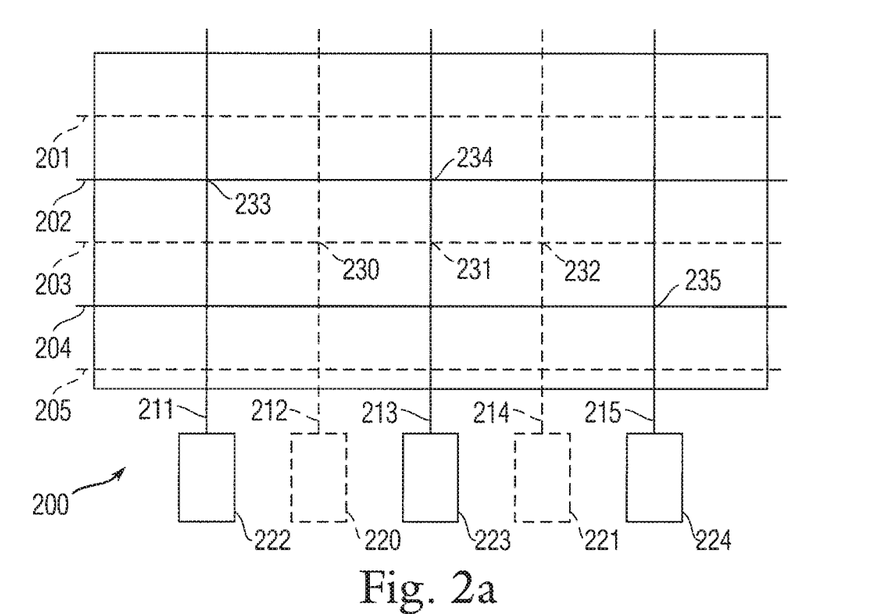
FIGS. 2A and 2B are diagrams of exemplary schemes of deactivating stimulus and/or data lines according to one embodiment of this invention.
Figure 2B:
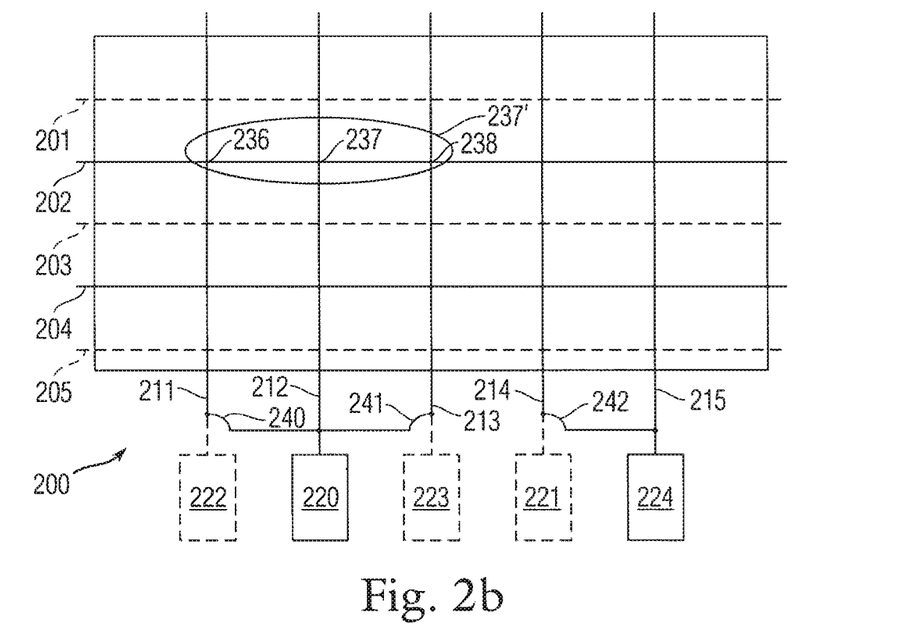

The granularity can be changed by selectively deactivating various stimulus and/or data lines. A stimulus line can be deactivated by not sending a stimulus signal on that line. A data line can be deactivated by removing power from the various circuits of the data line. FIGS. 2A and 2B show two exemplary schemes for deactivating stimulus and/or data lines.

FIG. 2A shows multi-touch panel (or portion thereof) 200. Stimulus lines 201-205 intersect data lines 211-215. Stimulus lines 201, 203 and 205 can be inactive. In other words, no stimulus signal may be sent along those lines. A stimulus signal can be sequentially sent along lines 202 and 204. Similarly, data lines 212 and 214 can be inactive. In other words, the sensing circuits connected to these lines (circuits 220 and 221, respectively) can be powered down.

In a single touch sensing panel, stimulus lines can be deactivated in the manner discussed above. If multiple sensing circuits are used (e.g., one per data line), data lines can also be deactivated in the manner discussed above. If a single time multiplexed sensing circuit is used, specific data lines can be deactivated by not connecting these data lines to the single sensing circuit.

Thus, some of the touch pixels (such as, e.g., pixels 230, 231, 232, etc.) can become inactive while other pixels (such as, e.g., pixels 233, 234, 235) can remain active. In general, an inactive pixel can be a pixel for which one or both of the stimulus line and the data line are not active.

Deactivating some pixels can reduce the density or granularity of existing touch pixels. It can also reduce the overall power requirements for the device. In some embodiments, various pixels can be dynamically deactivated and activated as the granularity requirements of various applications running at the display change, in order to ensure minimum power is being expended while also ensuring that the granularity requirements of the applications running on the device are satisfied.

As seen in FIG. 2A, the granularity can be reduced by deactivating every other stimulus and data line. However, other ratios can be used. For example, one in every three stimulus and data lines can be active. Some embodiments can provide multiple granularity levels by providing different ratios of active/inactive stimulus and/or data lines.

FIG. 2b shows a different scheme of reducing the granularity. In FIG. 2B sensing circuits 222, 223 and 221 can be deactivated. However the data lines corresponding to these deactivated circuits (i.e., data lines 211, 213 and 214) can be connected to neighboring active circuits. This effectively increases the size of active pixels by making neighboring pixels which would have been inactive in the scheme of FIG. 2A "join" the active pixels. Thus, what were pixels 236, 237 and 238 are all connected to a single sensor circuit and thus form a single pixel 237'. Note that these pixels are combined because the single sensing circuit can only sense the total capacitance of these pixels and not their individual capacitances.

If the granularity is to be increased again, sensing circuits 222, 223 and 221 can be turned back on and their respective data lines 211, 213 and 214 can be connected back to them. The data lines can be selectively connected to different sensing circuits through switches 240-242. Thus, the granularity of touch pixels can be selectively reduced and/or increased.

Figure 3:
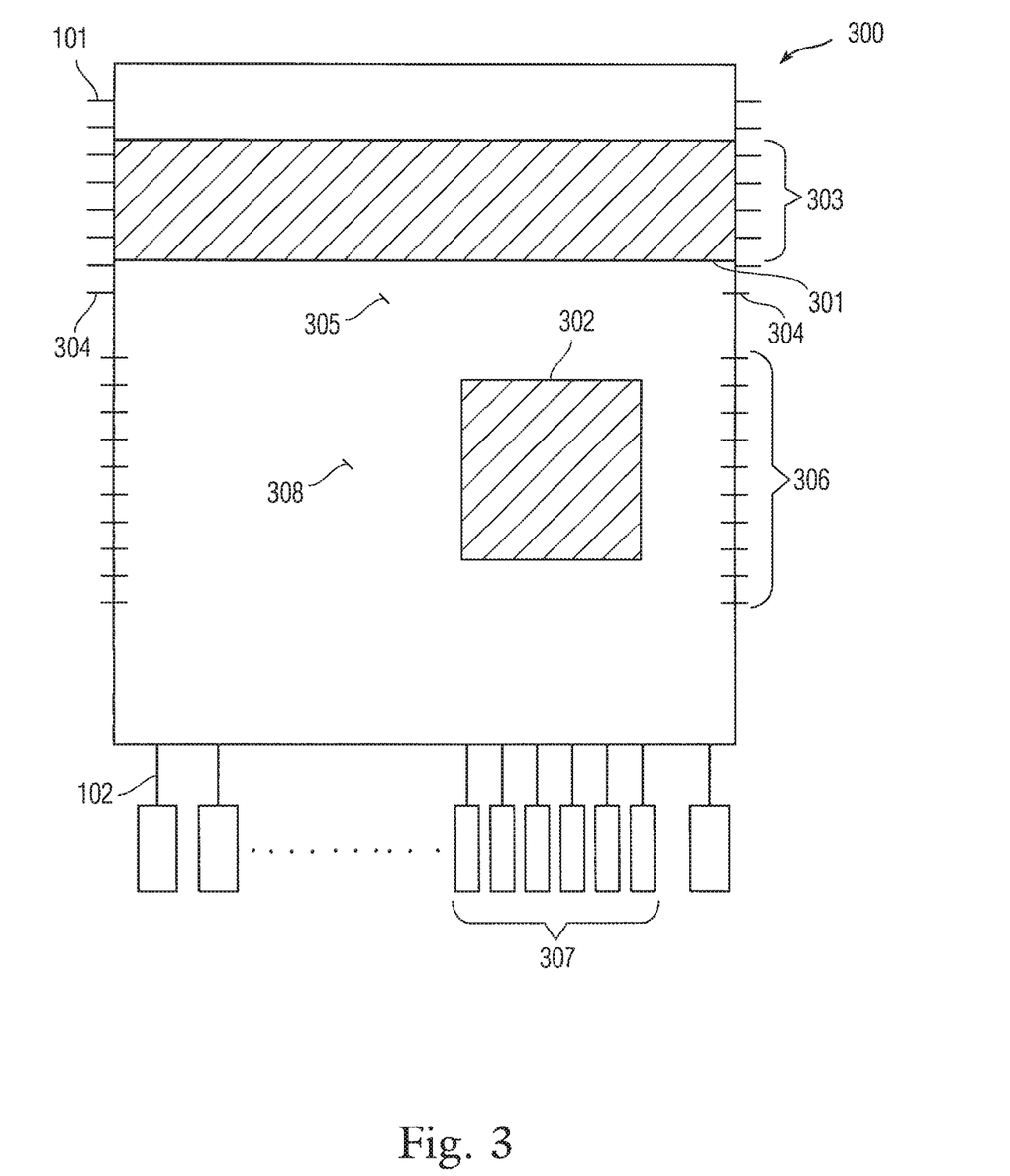
FIG. 3 is a diagram of the exemplary multi-touch enabled display of FIG. 1 when configured to include low granularity regions according to one embodiment of this invention.

FIG. 3 shows exemplary multi-touch display 300 that has been configured to include two low granularity regions.

Accordingly, low granularity regions 301 and 302 can be present. As discussed above, these regions can be dynamically formed after determining that fine resolution of touch data is not necessary for these regions at a particular time.

As noted above, stimulus lines 101 of the display can be activated or stimulated sequentially. Low granularity region 301 can be formed by not stimulating some lines selected from stimulus lines 303 which are associated with this region. For example, as shown in FIG. 2A, every other stimulus line can be left inactive. Furthermore, some of the sensor circuits 102 can also be deactivated (or powered down). However, in some embodiments, these sensor circuits may only be left inactive while region 301 is being stimulated (or, in other words, while the remaining active stimulus lines from stimulus lines 303 are being stimulated). When other stimulus lines are stimulated (e.g., stimulus line 304), all sensor circuits 102 can be activated in order to ensure that the granularity is not reduced for regions that are not intended to be of reduced granularity (e.g., region 305).

In order to reduce the granularity of region 302, some of the sensor circuits 307 associated with the region can be deactivated or powered down when one or more of the stimulus lines associated with region 302 (i.e., stimulus lines 306) are being stimulated. However, in contrast to region 301, in some embodiments, none of the stimulus lines 306 are deactivated. Thus, a granularity decrease for neighboring regions where such a decrease may not be desired (such as region 308) can be avoided. It should be noted that the above issue was not present for region 301 because that region spans the entire width of the display. Therefore deactivating some of the stimulus lines associated with that region may not result in granularity decreases for any other regions.

Figure 4:
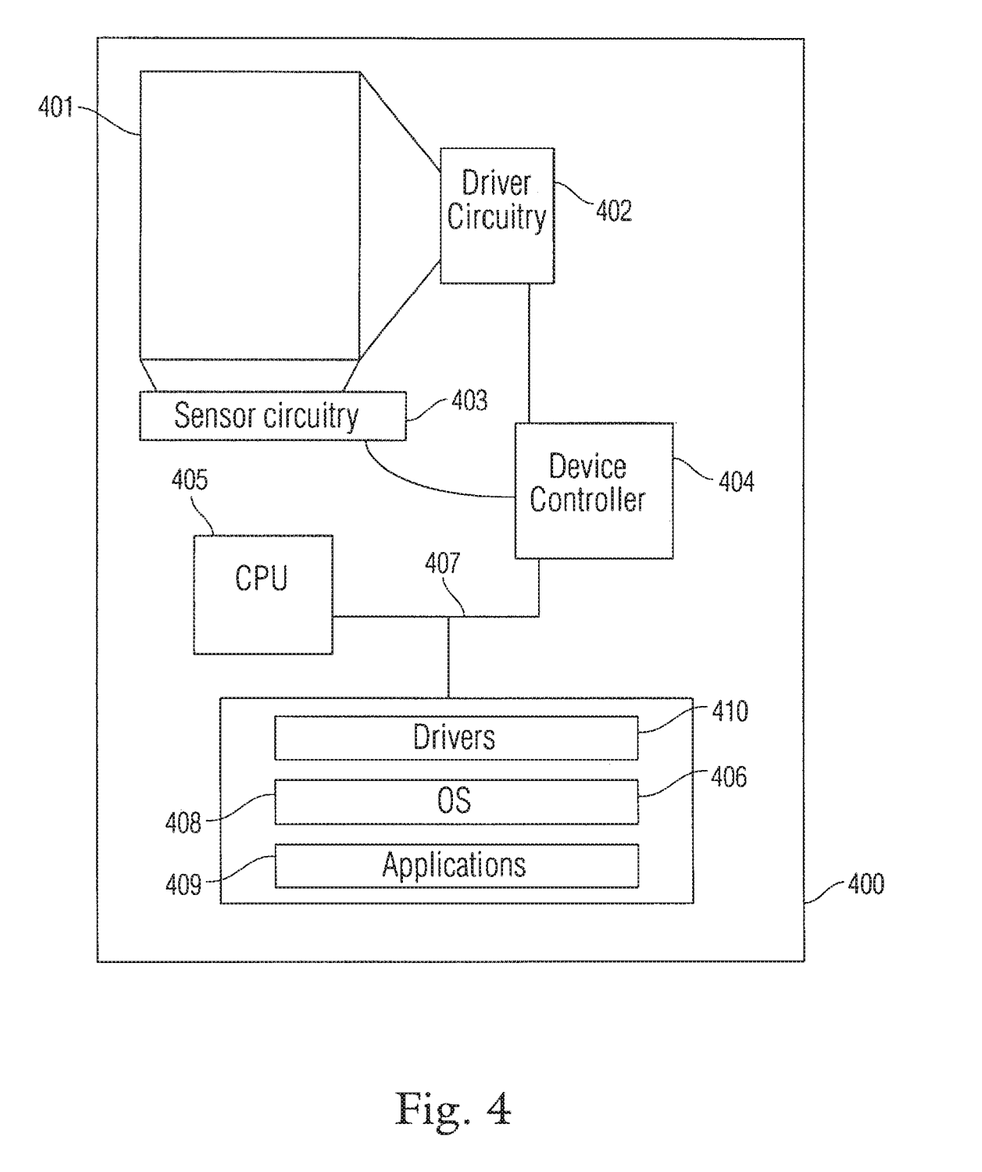
FIG. 4 is a diagram of an exemplary multi-touch enabled device according to one embodiment of this invention.

FIG. 4 is a diagram of an exemplary device according to an embodiment of this invention. Device 400 can comprise a multi-touch enabled display 401. The stimulus lines of the display can be connected to driver circuitry 402, while the data lines can be connected to sensor circuitry. The sensor circuitry can include the various sensor circuits 103.

The device can include device controller 404 connected to the driver and sensor circuitry. The device controller can be used to control the multi-touch functionality of the display. In some embodiments, the device controller can also be used to control the display functionality. The device can also include a CPU 405, a memory 406 and a bus 407 connecting various components.

Software stored on the memory can be executed by the CPU in order to effect the multi-touch device functionality. The software may include operating system (OS) 408, applications 409, drivers 410, as well as other software. The various software can determine what granularity is needed at various portions of the display at various times and cause the CPU to effect that granularity by sending instructions to the device controller. The device controller can, pursuant to the instructions, cause the driver circuitry to omit stimulating certain stimulus lines and/or the sensor circuitry to turn of certain sensor circuits in order to reduce the granularity of certain regions at certain times as discussed above.

Device 400 can be any multi-touch enabled device. For example, it can be a mobile telephone, an audio player (portable or non-portable), a PDA, a notebook computer, a desktop computer, any computing device, an informational kiosk, etc.

In one embodiment, a device such as device 400 can feature very coarse granularity if in sleep mode, or when a user is not interacting with the device. The coarse granularity can be used to detect when a user begins interacting with the device (thus causing the device to exit out of sleep mode). Once the device is out of sleep mode, it can increase the granularity in order to more effectively detect touch events.

Figure 5:
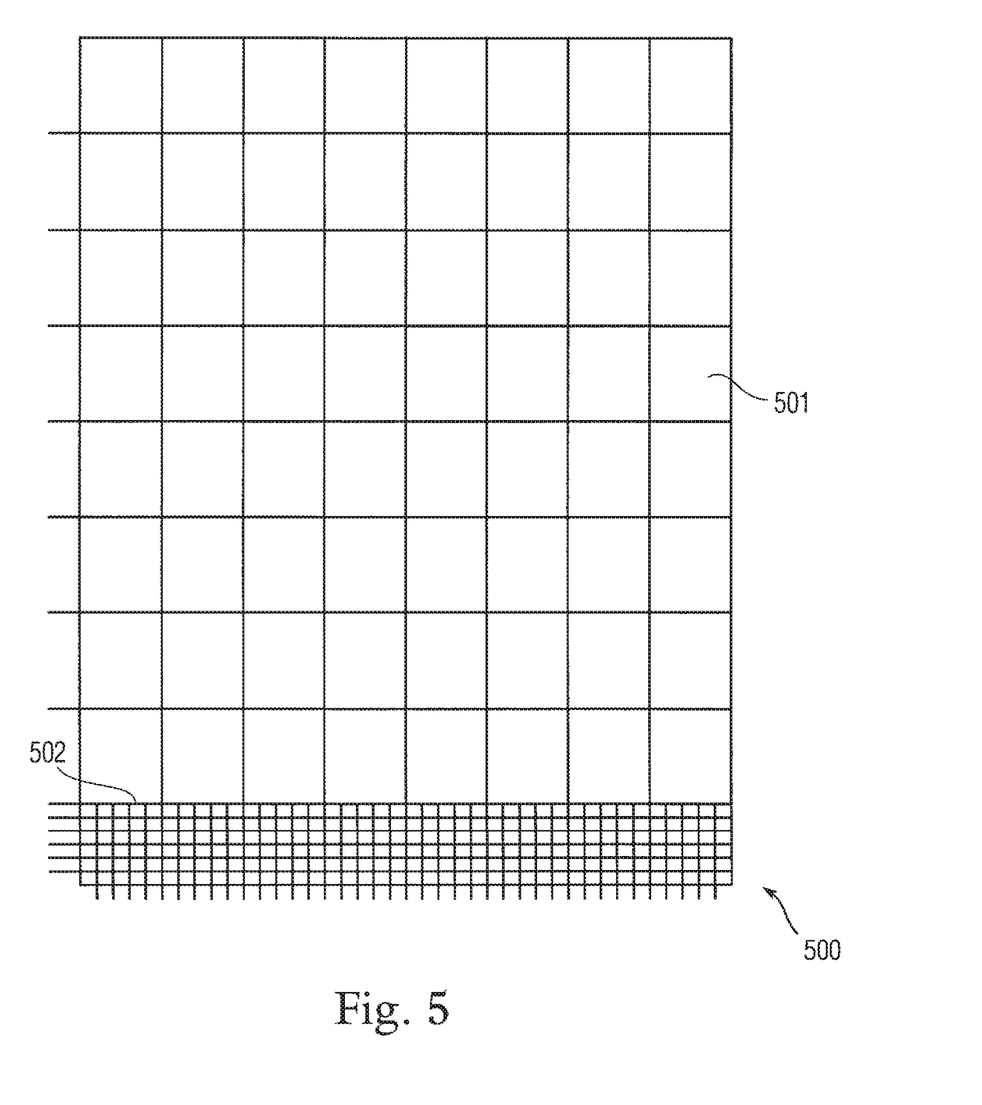
FIG. 5 is a diagram of an alternative multi-touch panel featuring varying granularity according to one embodiment of this invention.

FIG. 5 is a diagram of an alternative multi-touch panel featuring varying granularity. In the above discussed embodiments the granularity is varied dynamically. In other words, granularity can be changed during device operation. According to some embodiments a panel or display can be designed so that certain portions of it inherently have higher or lower granularity. For example, as seen in panel 500 of FIG. 5, low granularity portion 501 can cover most of the display, while high granularity portion 502 can be positioned along the bottom of the display as shown. Of course, in other embodiments the sizes and relative positions of portions of differing granularities can be different.

The granularity differences of portions 501 and 502 are not caused by selectively deactivating various lines (as discussed above) but by placing a relatively high number of lines in the high granularity portion and a lower number of lines in the low granularity portions, as shown.

This embodiment can be used for systems where it is known that a limited portion of the display may need to feature higher granularity. For example, the high granularity portion can be used for stylus based handwriting recognition, while the low granularity portion can be used for finger based touch sensing. In an alternative embodiment, the high granularity portion can be used for fingerprint recognition.

The dynamic granularity control discussed above can also be used in conjunction with the embodiment of FIG. 5. For example if the embodiment of FIG. 5 is used for handwriting recognition, but a certain software presently running on the device does not feature handwriting recognition and relies entirely on touch sensing, then the methods discussed above can be used to reduce the granularity of portion 502 to match that of portion 501 in order to save power.

The above noted application Ser. No. 11/649,998 discusses far-field and near-field proximity displays as well as touch sensing displays. Near-field proximity displays can utilize the same or similar methods to those used by multi-touch displays discussed above. More specifically, they can sense proximity events (i.e., fingers or other objects being placed in proximity to the display) and their locations based on mutual capacitance measurements using circuitry identical or similar to the multi-touch enabled displays discussed above.

Far-field proximity displays can sense proximity events utilizing other proximity sensors such as, for example, infrared transmitters and receivers. These displays can also include stimulus lines, data lines and sensing circuits. For example a row of infrared transmitters can be connected to a stimulus line and a column of infrared receivers can be connected to a data line terminating at a sensor circuit. Far-field proximity sensors may be able to sense proximity events at greater distances than near-field ones. Both far-field and near-field proximity sensors can be pixel based.

Far-field and near-field proximity sensing panels can feature multi pixel sensing (i.e., being able to detect multiple events at the same time) and/or single pixel sensing (i.e., being able to detect a single event at a time). A multi-touch or single touch display can also combine far-field and/or near-field proximity sensor functionality. Embodiments of the invention can include far-field or near-field sensor panels including varying granularity features similar to the ones discussed above in connection with multi-touch panels. Furthermore, embodiments can include panels that feature a combination of far-field, near-field and multi-touch functionality and configured to provide varying granularity for one, or multiple of these functionalities.

Generally, embodiments of the present invention can be applicable to any devices that include event sensing panels. As discussed above, the event sensing panels can be, for example, single-touch panels, multi-touch panels, far-field proximity panels and/or near-field proximity panels. Other event sensing panels can also be used. These panels can be displays. Alternatively, these can be panels that do not feature any display functionality. The panels can include event sensing pixels. The event sensing pixels can be touch sensing pixels, far-field proximity sensing pixels and/or near field proximity sensing pixels. In some cases a single pixel can combine two or more functionalities. For example, as discussed above a single mutual capacitance based pixel can be used both for touch sensing and near-field proximity sensing. Also, pixels of different types can be placed in the same panel.

It should be noted that according to the above discussed embodiments, the granularity of event sensing pixels can be changed, or can differ at the panel or display hardware level. In other words, the granularity is controlled by actually activating/deactivating panel hardware components or providing panel hardware components (e.g., stimulus and data lines) of differing densities. Other existing systems can control granularity at higher levels, such as a controller hardware level, or software level by, for example, performing various types of compression on the raw data provided by the display, or simply ignoring some of the raw data. These systems can be of limited utility as compared to embodiments of the invention as they still require the low level panel hardware to operate at higher granularity and thus use relatively high amounts of power. On the other hand, embodiments of the invention can reduce the power used by actually reducing the granularity at the panel level.

Figure 6A:
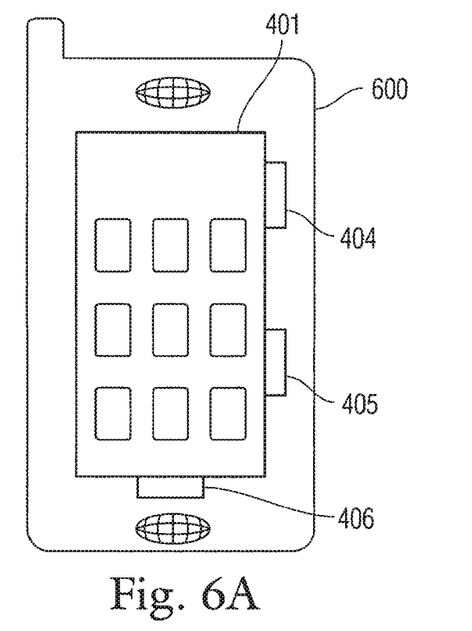
FIG. 6A is a diagram of a mobile telephone according to one embodiment of this invention.

FIG. 6A is a diagram of an embodiment of the invention. More specifically, FIG. 6A is a diagram of a mobile telephone according to an embodiment of the invention. The mobile telephone can be similar to the device shown in FIG. 4. It can include a display 401 that implements the varying granularity features discussed above. Various internal elements, such as controller 404, processor 405 and memory 406 can be placed under the display.

Figure 6B:
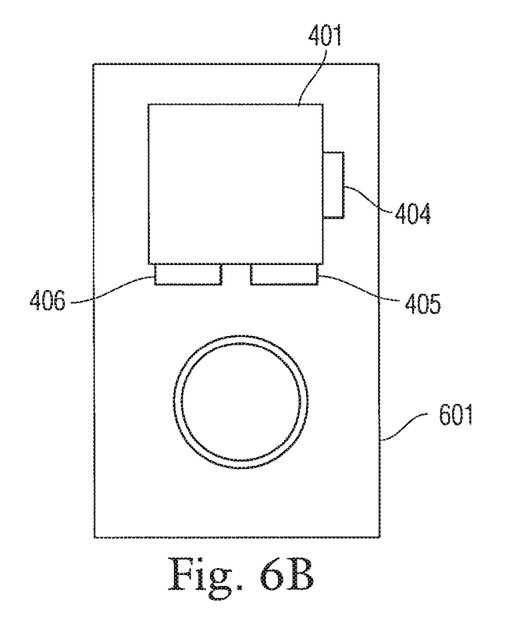
FIG. 6B is a diagram of an audio player according to one embodiment of this invention.

Similarly, FIG. 6B is a diagram of an audio player according to an embodiment of the invention. The audio player can be a portable digital audio player or an audio player of another type. Again, the audio player can be similar to the device shown in FIG. 4. It can include a display 401 that implements the varying granularity features discussed above. Various internal elements, such as controller 404, processor 405 and memory 406 can be placed under the display.

Although the invention has been fully described in connection with embodiments thereof with reference to the accompanying drawings, it is to be noted that various changes and modifications will become apparent to those skilled in the art. Such changes and modifications are to be understood as being included within the scope of the invention as defined by the appended claims.

What is claimed is:

1. A method for operating a touch screen included in a touch enabled device, the touch enabled device including a processor, the method comprising:

operating the touch screen, the touch screen having a plurality of portions, the plurality of portions including one or more first portions and one or more second portions, each having characteristics, the characteristics including a respective level of granularity,
wherein at a first time, the level of granularity of the one or more first portions is different from the level of granularity of the one or more second portions; and
dynamically changing at least one of the characteristics of one or more of the one or more first portions and the one or more second portions at a second time, the second time being different from the first time.

2. The method of claim 1, wherein the at least one of the characteristics includes position, and wherein the positions of the one or more first portions are dynamically changed concurrently with the positions of the one or more second portions at the second time.

3. The method of claim 1, wherein the at least one of the characteristics includes size, and the size of one or more of the one or more first portions and the one or more second portions is dynamically changed at the second time.

4. The method of claim 1, wherein a level of granularity of a given portion is based on an expected type of user input.

5. The method of claim 1, wherein the touch screen is operated based on one or more applications running on the touch enabled device, and the characteristics of the plurality of portions are based on the one or more applications.

6. The method of claim 5, wherein the one or more applications includes a tool bar.

7. The method of claim 1, further comprising:
displaying one or more visual control elements at the one or more first portions; and
not displaying visual control elements at the one or more second portions.

8. The method of claim 7, wherein the one or more visual control elements include one or more of buttons, knobs, and sliders.

9. The method of claim 1, further comprising:
receiving a touch input at the one or more first portions; and
changing a volume of sound emitted by the touch enabled device in response to the received touch input.

10. The method of claim 1, further comprising:
receiving a touch input at the one or more first portions; and
starting or stopping a video playback in response to the received touch input.

11. The method of claim 1, further comprising:
receiving a touch input at the one or more first portions; and
fast forwarding or reversing a video in response to the received touch input.

12. The method of claim 1, wherein the level of granularity of the one or more first portions is greater than the level of granularity of the one or more second portions.

13. The method of claim 1, wherein the at least one of the characteristics is dynamically changed in software.

14. A touch enabled device comprising:
memory;
a touch screen; and
a processor configured to:
operate the touch screen, the touch screen having a plurality of portions, the plurality of portions including one or more first portions and one or more second portions, each having characteristics, the characteristics including a respective level of granularity, wherein at a first time, the level of granularity of the one or more first portions is different from the level of granularity of the one or more second portions; and
dynamically change at least one of the characteristics of one or more of the one or more first portions and the one or more second portions at a second time, the second time being different from the first time.

15. The touch enabled device of claim 14, wherein the touch screen is a multi-touch panel.

16. The touch enabled device of claim 14, wherein the at least one of the characteristics includes position, and the positions of the one or more first portions are dynamically changed concurrently with the positions of the one or more second portions at the second time.

17. The touch enabled device of claim 14, wherein the at least one of the characteristics includes size, and the size of one or more of the one or more first portions and the one or more second portions is dynamically changed at the second time.

18. The touch enabled device of claim 14, wherein the touch screen is operated based on one or more applications running on the touch enabled device, and the characteristics of the plurality of portions are based on the one or more applications.

19. The touch enabled device of claim 14, further comprising:
a display configured to:
display one or more visual control elements at the one or more first portions; and
not display visual control elements at the one or more second portions.

20. A non-transitory computer readable medium, the computer readable medium comprising instructions that, when executed, perform a method of managing memory allocations, the method comprising:
operating the touch screen, the touch screen having a plurality of portions, the plurality of portions including one or more first portions and one or more second portions, each having characteristics, the characteristics including a respective level of granularity, wherein at a first time, the level of granularity of the one or more first portions is different from the level of granularity of the one or more second portions; and
dynamically changing at least one of the characteristics of one or more of the one or more first portions and the one or more second portions at a second time, the second time being different from the first time.

* * * * *

UNITED STATES PATENT AND TRADEMARK OFFICE
CERTIFICATE OF CORRECTION

PATENT NO. : 10,642,330 B2
APPLICATION NO. : 16/013754
DATED : May 5, 2020
INVENTOR(S) : Wayne Carl Westerman et al.

Page 1 of 1

It is certified that error appears in the above-identified patent and that said Letters Patent is hereby corrected as shown below:

On the Title Page

In Item (54), in title, delete "INTERGRATED" and insert -- INTEGRATED --.

In the Specification

In Column 1, Line 1, delete "INTERGRATED" and insert -- INTEGRATED --.

Signed and Sealed this
Third Day of September, 2024

Katherine Kelly Vidal
*Director of the United States Patent and Trademark Office*